(12) United States Patent
Goh et al.

(10) Patent No.: US 8,285,405 B2
(45) Date of Patent: Oct. 9, 2012

(54) METHODS AND AN APPARATUS FOR OPTIMIZING PLAYBACK OF MEDIA CONTENT FROM A DIGITAL HANDHELD DEVICE

(75) Inventors: Aik Hee Daniel Goh, Singapore (SG);
Susimin Suprapmo, Singapore (SG)

(73) Assignee: Creative Technology Ltd, Singapore (SG)

( * ) Notice: Subject to any disclaimer, the term of this patent is extended or adjusted under 35 U.S.C. 154(b) by 347 days.

(21) Appl. No.: 12/394,013

(22) Filed: Feb. 26, 2009

(65) Prior Publication Data
US 2010/0217411 A1     Aug. 26, 2010

(51) Int. Cl.
*G06F 17/00*     (2006.01)
(52) U.S. Cl. .......................................... 700/94
(58) Field of Classification Search ..................... 700/94
See application file for complete search history.

(56) References Cited

U.S. PATENT DOCUMENTS

| | | | | |
|---|---|---|---|---|
| 5,386,478 A | * | 1/1995 | Plunkett | 381/103 |
| 5,818,389 A | * | 10/1998 | Lazar | 342/383 |
| 5,872,743 A | * | 2/1999 | Maxwell | 367/96 |
| 7,356,334 B2 | | 4/2008 | Yamashita | |
| 7,483,540 B2 | * | 1/2009 | Rabinowitz et al. | 381/103 |
| 7,624,420 B2 | * | 11/2009 | Miyagawa | 725/151 |
| 2005/0250543 A1 | * | 11/2005 | Thermond | 455/562.1 |
| 2007/0061490 A1 | * | 3/2007 | Sullivan et al. | 709/247 |
| 2007/0130605 A1 | * | 6/2007 | Chung | 725/131 |
| 2007/0155313 A1 | * | 7/2007 | Goldberg et al. | 455/3.06 |
| 2008/0037674 A1 | * | 2/2008 | Zurek et al. | 375/262 |
| 2008/0091764 A1 | * | 4/2008 | Sutardja et al. | 709/201 |
| 2008/0144876 A1 | * | 6/2008 | Reining et al. | 381/369 |
| 2008/0293492 A1 | | 11/2008 | Jawad et al. | |
| 2009/0202099 A1 | * | 8/2009 | Hsu et al. | 381/387 |
| 2009/0319063 A1 | * | 12/2009 | Pan | 700/94 |
| 2010/0026578 A1 | * | 2/2010 | Furnanz et al. | 342/419 |
| 2010/0057969 A1 | * | 3/2010 | Meiri et al. | 710/303 |
| 2010/0082868 A9 | * | 4/2010 | Matthews et al. | 710/303 |

FOREIGN PATENT DOCUMENTS

WO    WO2008136950 A1    11/2008
WO    WO2009012045 A1    1/2009

* cited by examiner

*Primary Examiner* — Paul McCord
(74) *Attorney, Agent, or Firm* — Creative Technology Ltd

(57) ABSTRACT

There is provided an apparatus and methods for optimizing playback of media content from a digital handheld device. The apparatus may be functionally connected to the digital handheld device, and for allowing placement of the digital handheld device at a receptor. Correspondingly, the methods for optimizing playback of media content from a digital handheld device preferably entail a usage of the aforementioned apparatus.

20 Claims, 4 Drawing Sheets

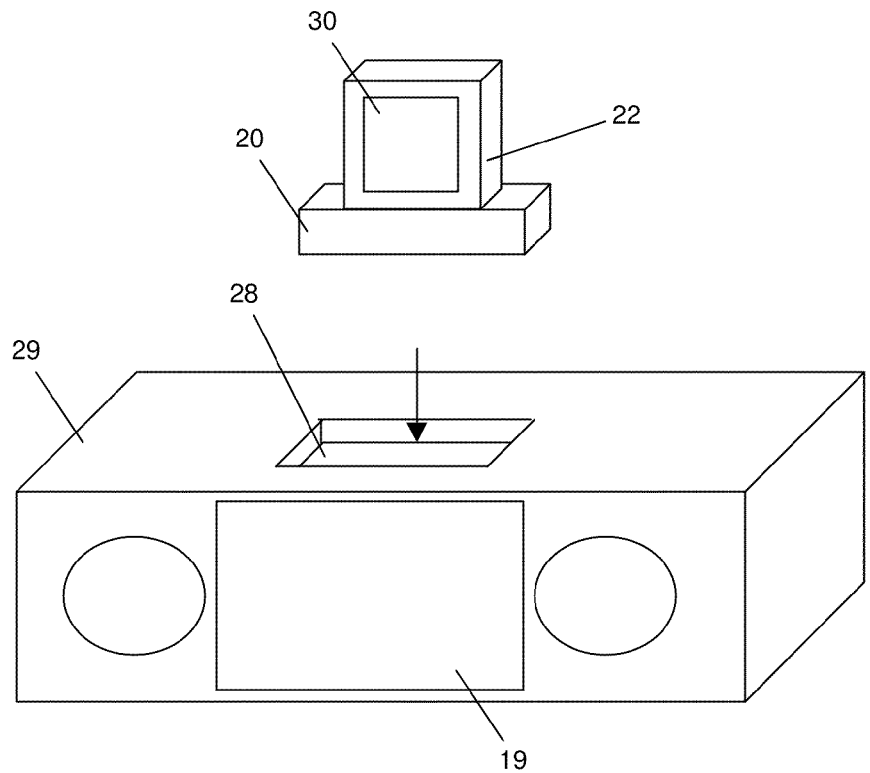
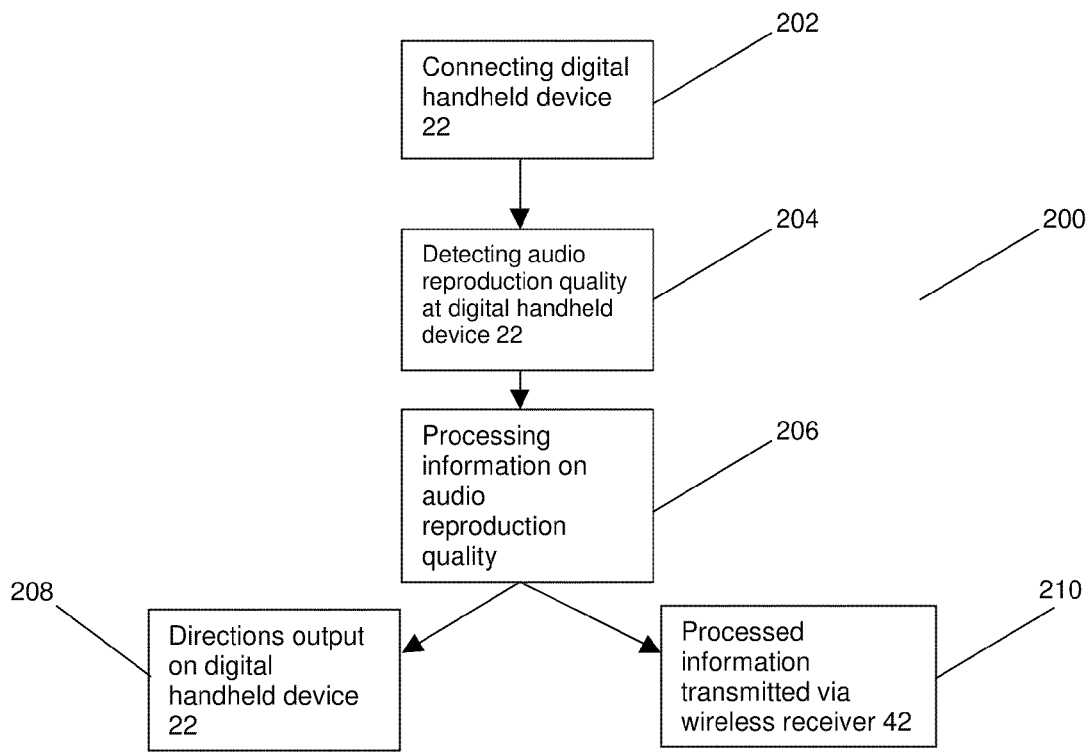
Figure 6
Figure 7

METHODS AND AN APPARATUS FOR OPTIMIZING PLAYBACK OF MEDIA CONTENT FROM A DIGITAL HANDHELD DEVICE

FIELD OF INVENTION

This invention relates to playback of media content, specifically, methods and an apparatus for optimizing playback of media content from a digital handheld device.

BACKGROUND

The widespread adoption of digital handheld devices has led to an increasing number of accessories being introduced to enhance both the usability and functionality of the digital handheld devices. Some of these accessories aid in the reproduction of media content played back using the digital handheld devices.

A category of such accessories which aid in the reproduction of media content from the digital handheld devices relates to docking apparatus for the digital handheld devices. For example, there are docking apparatus like the XDock from Creative Technology Ltd which are able to enhance audio output from a digital handheld devices coupled to the docking apparatus. In addition, there are also a docking apparatus like the Playdock i500 from Creative Technology Ltd which is able to amplify audio output from a digital handheld device coupled to the docking apparatus.

Some docking apparatus allow wireless connection to the digital handheld devices. However, these wirelessly connectable docking apparatus which enable audio output do not vary the audio output in accordance with a position of the digital handheld device. This typically results in audio output which may be less than desirable and as such, the docking apparatus does not effectively enhance both the usability and functionality of the digital handheld devices. In an instance of a wirelessly connectable docking apparatus which enable both image and audio output, currently, the media output also does not vary in accordance with a position of the digital handheld device. This is rather undesirable.

Thus, there are issues pertaining to accessories of digital handheld devices which need to be addressed such that both the usability and functionality of the digital handheld devices are truly enhanced.

SUMMARY

In a first aspect, there is provided an apparatus for optimizing playback of media content from a digital handheld device. The apparatus may be functionally connected to the digital handheld device, and for allowing placement of the digital handheld device at a receptor. The apparatus may include a first electrical contact set for a functional connection to a second electrical contact set located within the receptor; at least one electrical line coupled to the first electrical contact set for passing current from the second electrical contact set via the first electrical contact set to a first connector which is able to couple to a second connector of the digital handheld device; at least one data line coupled to the first connector for passing data from the digital handheld device via the first connector to either a wireless transceiver or the first electrical contact set; a controller located along the at least one electrical line and the at least one data line; and at least one motion sensor coupled to the controller for detecting movement of the apparatus.

It is advantageous that data on the movement of the apparatus detected by the at least one motion sensor is input to the controller, with the controller processing the data to either output directions on the digital handheld device for a user of the digital handheld device, or transmitting the data via the wireless transceiver. The directions may preferably lead the user to a position of optimum sound reproduction by the sound reproduction device. Similarly, the directions may lead the user to a position of at least one of, optimum image reproduction and optimum sound reproduction, by the media reproduction device.

It is preferable that the receptor is incorporated into either a sound reproduction device or a media reproduction device. It is preferable that the receptor is only able to receive the apparatus. It is advantageous that the placement of the digital handheld device at the receptor enables charging of a power source of the digital handheld device.

The wireless transceiver coupled to the controller may be for transmitting data wirelessly from the digital handheld device coupled to the apparatus to either the sound reproduction device or the media reproduction device. The transmitted data may be either media content playback instructions or media content. Transmitting the data via the wireless transceiver to either a sound reproduction device or a media reproduction device may vary media playback parameters of either the sound reproduction device or the media reproduction device. The media playback parameters may include, for example, relative audio phase, audio delay, amplitude of audio, frequency response of audio, image contrast, image refresh rate, image brightness and so forth. It is advantageous that variation of the media playback parameters ensures optimal media content playback at a position of the user of the apparatus.

The first electrical contact set may also be for transmitting data from a digital handheld device coupled to the apparatus to either the sound reproduction device or the media reproduction device. The transmitted data may be either media content playback instructions or media content.

Preferably, the controller is able to transcode the media content to minimize a processing load on the digital handheld device.

The apparatus may further include an induction charging module coupled to the at least one electrical line, the induction charging module being for enabling induction charging of a power source of the digital handheld device when the digital handheld device is functionally connected to the apparatus.

In addition, the apparatus may also further include at least one acoustic sensor coupled to the controller for detecting audio reproduction quality at the apparatus, where information on the audio reproduction quality at the apparatus is input to the controller, the controller processing the information on the audio reproduction quality at the apparatus to either output directions on the digital handheld device for a user of the digital handheld device, or transmit the data via the wireless transceiver. Preferably, the at least one acoustics sensor includes: a microphone for detecting audio reproduction; and an audio module for determining the audio reproduction quality of the detected audio.

In a second aspect, there is provided a method for optimizing playback of media content from a digital handheld device. The method includes connecting the digital handheld device to either a sound reproduction device or a media reproduction device with the connection being wireless through a wireless transceiver; detecting movement of the digital handheld device relative to either the sound reproduction device or the media reproduction device; and processing data pertaining to the movement of the digital handheld device. The movement of the digital handheld device may be detected with at least one motion sensor.

It is preferable that either directions are output on the digital handheld device for a user of the digital handheld device, or the processed data is transmitted via the wireless transceiver. The directions may preferably lead the user to a position of optimum sound reproduction by the sound reproduction device. Similarly, the directions may preferably lead the user to a position of at least one of, optimum image reproduction and optimum sound reproduction, by the media reproduction device. It is preferable that the processed data may be transmitted via the wireless transceiver to either the sound reproduction device or the media reproduction device, with the processed data being used for varying media playback parameters. The media playback parameters may include, for example, relative audio phase, audio delay, amplitude of audio, frequency response of audio, image contrast, image refresh rate, image brightness and the like. It is advantageous that variation of the media playback parameters ensures optimal media content playback at a position of the user of the digital handheld device.

In a third aspect, there is provided another method for optimizing playback of media content from a digital handheld device. The method includes connecting the digital handheld device to either a sound reproduction device or a media reproduction device with the connection being wireless through a wireless transceiver; detecting audio playback quality at the digital handheld device; and processing information pertaining to the audio playback quality. The audio playback quality at the digital handheld device may be detected with at least one acoustics sensor. Preferably, either directions are output on the digital handheld device for a user of the digital handheld device, or the processed information is transmitted via the wireless transceiver. The directions may advantageously lead the user to a position of optimum sound reproduction by the sound reproduction device. Similarly, the directions may advantageously lead the user to a position of at least one of, optimum image reproduction and optimum sound reproduction, by the media reproduction device.

It is preferable that the processed information may be transmitted via the wireless transceiver to either the sound reproduction device or the media reproduction device, with the processed information being used for varying media playback parameters. The media playback parameters may include, for example, relative audio phase, audio delay, amplitude of audio, frequency response of audio and so forth. It is preferable that the variation of the media playback parameters ensures optimal media content playback at a position of the user of the digital handheld device.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

FIG. 6 shows a second in-use perspective view of the apparatus of the present invention.

FIG. 7 shows a process flow of a second method of the present invention.

DESCRIPTION OF PREFERRED EMBODIMENTS

Figure 1:
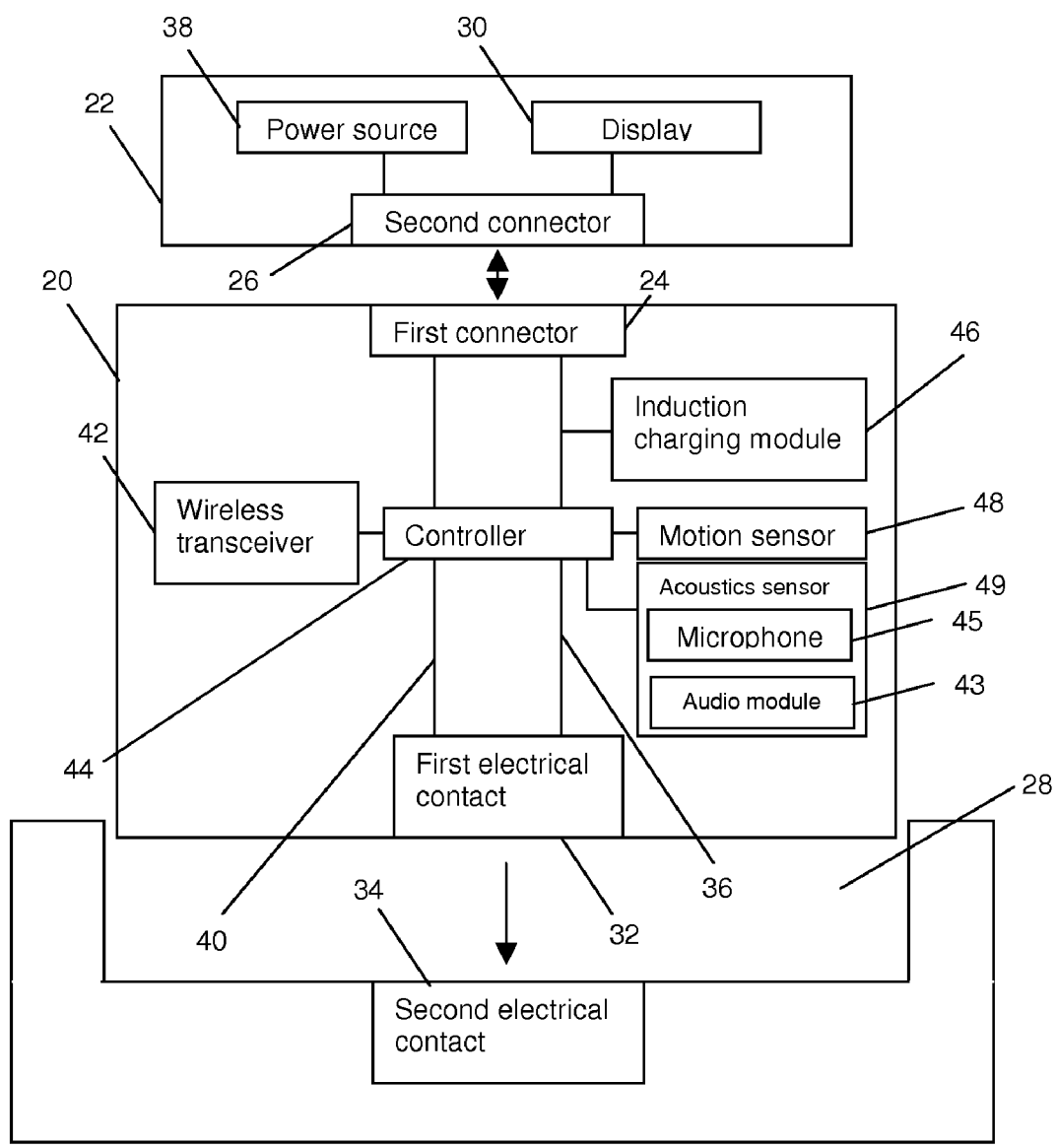
FIG. 1 shows a schematic view of an apparatus of the present invention.
Figure 2:
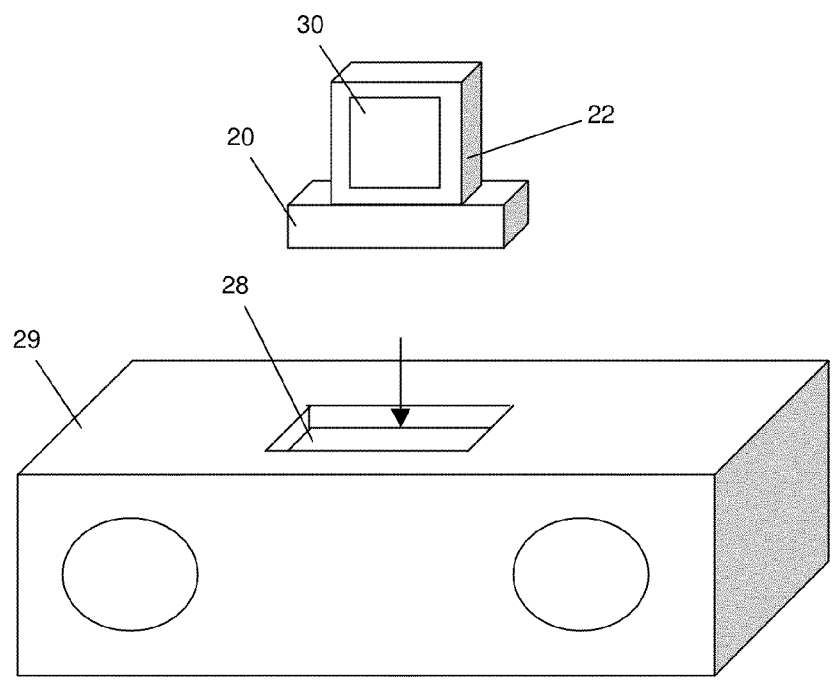
FIG. 2 shows a first in-use perspective view of the apparatus of the present invention.

Referring to FIGS. 1, 2 and 6, there is shown a schematic view and in-use perspective views respectively of an apparatus 20 for optimizing playback of media content from a digital handheld device 22. The digital handheld device 22 may include, for example, a media player, a mobile phone, a digital camera, a navigation device, any combination of the aforementioned and so forth. The media content may be either permanently stored in the digital handheld device 22 or may be streamed from an external media content repository to the digital handheld device 22. The apparatus 20 may be functionally connected to the digital handheld device 22.

A first connector 24 of the apparatus 20 may couple with a second connector 26 of the digital handheld device 22 for the apparatus 20 to be functionally connected to the digital handheld device 22. The first connector 24 and the second connector 26 may be in a form of, for example, a USB connector pairing, a Firewire connector pairing, a proprietary connector pairing and so forth. It is preferable that the first connector 24 and the second connector 26 are coupled in a secure manner such that the apparatus 20 is not easily separated from the digital handheld device 22 once the first connector 24 and the second connector 26 are coupled to one another. When the digital handheld device 22 is functionally connected to the apparatus 20, it allows placement of the digital handheld device 22 at a receptor 28. The receptor 28 may be incorporated into either a sound reproduction device or a media reproduction device.

FIG. 2 shows the receptor 28 being incorporated in a sound reproduction device 29. The receptor 28 may be only able to receive the apparatus 20. This is preferable such that a display 30 and controls (not shown) of the digital handheld device 22 may be viewable and accessible even when the receptor 28 has received the apparatus 20. Thus, the digital handheld device 22 may still be controllable via either the display 30 (with touch screen functionality) or the controls when the receptor 28 has received the apparatus 20.

FIG. 6 shows the receptor 28 being incorporated in a media reproduction device 27. The media reproduction device 27 as shown differs from the sound reproduction device 29 as mentioned earlier in as there is a screen 19 for displaying both still and moving images. The receptor 28 may be only able to receive the apparatus 20. This is preferable such that a display 30 and controls (not shown) of the digital handheld device 22 may be viewable and accessible even when the receptor 28 has received the apparatus 20. Thus, the digital handheld device 22 may still be controllable via either the display 30 (with touch screen functionality) or the controls when the receptor 28 has received the apparatus 20.

The apparatus 20 includes a first electrical contact set 32 which may be for a functional connection to a second electrical contact set 34 located within the receptor 28. The first electrical contact set 32 and the second electrical contact set 34 may be in a form of, for example, a USB connector pairing, a Firewire connector pairing, a proprietary connector pairing, electrical conductor strips and so forth. A curvature and shape of the receptor 28 may affect how the apparatus 20 is received by the receptor 28. The curvature and shape of the receptor 28 may be formed in a manner which facilitates ease of connection between the first electrical contact set 32 and the second electrical contact set 32. For example, the apparatus 20 may be dropped into the receptor 28 and a combination of gravity, curvature of the receptor 28 and shape of the receptor 28 enable the first electrical contact set 32 to be functionally connected to the second electrical contact set 34.

The apparatus 20 may include at least one electrical line 36 coupled to the first electrical contact set 32 for passing current from the second electrical contact set 34 via the first electrical contact set 32 to the first connector 24 which is able to couple to the second connector 26 of the digital handheld device 22. The current may be provided by either the sound reproduction device 29 or the media reproduction device 27 which the receptor 28 is incorporated within. It should be appreciated that the at least one electrical line 36 includes at least power, and ground wires. The at least one electrical line 36 may ensure that placement of the digital handheld device 22 at the receptor 28 may enable charging of a power source 38 of the digital handheld device 22 when the digital handheld device 22 is coupled to the apparatus 20.

Alternatively, the apparatus 20 may include an induction charging module 46 which may be coupled to the at least one electrical line 36. The induction charging module 46 may be for enabling induction charging of the power source 38 of the digital handheld device when the digital handheld device 22 is functionally connected to the apparatus 20. In this instance, current need not pass through from the second electrical contact set 34 to the first electrical contact set 32.

There may also be at least one data line 40 coupled to the first connector 24 for passing data from the digital handheld device 22 via the first connector 24 to either a wireless transceiver 42 or the first electrical contact set 32. The data from the digital handheld device 22 may be either media content playback instructions or media content. The apparatus 20 may also include a controller 44 located along the at least one electrical line 36 and the at least one data line 40. The controller 44 may be able to transcode media content to minimize a processing load on the digital handheld device 22. This may be advantageous when the digital handheld device 22 is being concurrently employed for multiple applications.

The wireless transceiver 42 may be coupled to the controller 44. The wireless transceiver 42 may be for transmitting data wirelessly from the digital handheld device 22 coupled to the apparatus 20 to either the sound reproduction device 29 or the media reproduction device 27. The wireless transceiver 42 may be for high bandwidth transmissions such that video may be transmitted. Alternatively, when data is passed to the first electrical contact set 32, the data is directly transmitted from the digital handheld device 22 coupled to the apparatus 20 to either the sound reproduction device 29 or the media reproduction device 27.

The apparatus 20 may also include at least one motion sensor 48 coupled to the controller 44 for detecting movement of the apparatus 20, and correspondingly, movement of the digital handheld device 22 coupled to the apparatus 20. The at least one motion sensor 48 may include, for example, accelerometers, gyroscopes, and the like. Data in relation to the movement of the apparatus 20 detected by the at least one motion sensor 48 may be input to the controller 44, and the controller 44 may process the data to either output directions on the digital handheld device 22 for the user of the digital handheld device 22, or transmit the data via the wireless transceiver 42 to either the sound reproduction device 29 or the media reproduction device 27. The data may include a vector sum of movement of the apparatus 20 relative to either the sound reproduction device 29 or the media reproduction device 27.

In addition, or alternatively in an absence of the at least one motion sensor 48, the apparatus 20 may also include at least one acoustics sensor 49 coupled to the controller 44 for detecting audio reproduction quality at a discrete location of the apparatus 20. The at least one acoustics sensor 49 may include, a microphone 45 for detecting audio reproduction and an audio module 43 for determining the audio reproduction quality of the detected audio. Information on the audio reproduction quality may be input to the controller 44, and the controller 44 may process the information to either output directions on the digital handheld device 22 for the user of the digital handheld device 22, or transmit the information via the wireless transceiver 42 to either the sound reproduction device 29 or the media reproduction device 27.

The directions may be output on the display 30 of the digital handheld device 22 and may advantageously lead the user to a position of optimum sound reproduction by the sound reproduction device 29. It should be appreciated that the position of optimum sound may vary from user to user, as each user may have either different preferences in relation to sound reproduction quality or different degrees of ear sensitivity. As such, the position of optimum sound reproduction may be a position where a majority of persons is deemed to perceive optimum sound reproduction. The directions may also be output on the digital handheld device 22 in an audible form. Similarly, the directions may lead the user to a position of at least one of, optimum image reproduction and optimum sound reproduction, by the media reproduction device 27. Presenting the directions on the digital handheld device 22 would be desirable when media output from either the sound reproduction device 29 or the media reproduction device 27 is not variable.

When the media output from either the sound reproduction device 29 or the media reproduction device 27 is variable, the information may preferably be transmitted via the wireless transceiver 42 to either the sound reproduction device 29 or the media reproduction device 27. As such, when the information via the wireless transceiver 42 is received by either the sound reproduction device 29 or the media reproduction device 27, the received information may be processed such that media playback parameters of either the sound reproduction device 29 or the media reproduction device 27 are varied. The media playback parameters may include, for example, relative audio phase, audio delay, amplitude of audio, frequency response of audio, image contrast, image refresh rate, image brightness, and so forth. The variation of the media playback parameters advantageously ensures optimal media content playback at a position of the user of the apparatus 20, in a manner which is not limited by the position of the user. The media output may thus be optimized for a particular position of the user.

Figure 3:
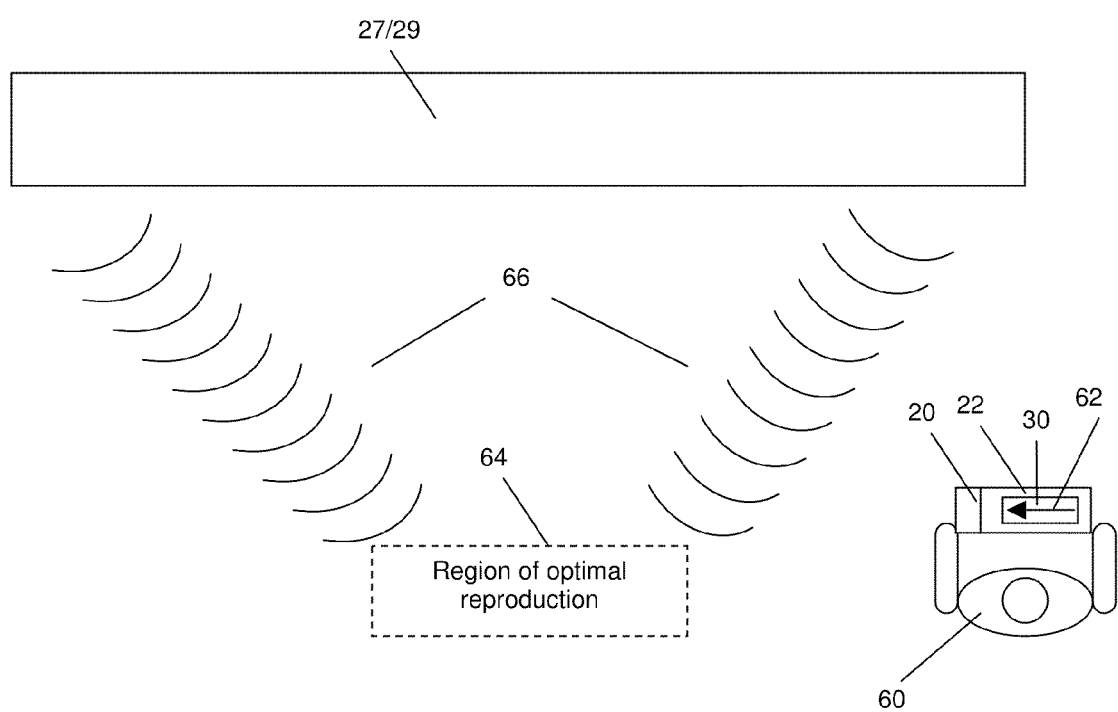
FIG. 3 shows a top view of a first usage scenario of the apparatus of the present invention.

Referring to FIG. 3, there is shown a top view of the instance when directions are output on the display 30 of the digital handheld device 22. The user 60 of the digital handheld device 22 which is coupled to the apparatus 20 is shown an arrow 62 which directs the user 60 towards a region of optimal media reproduction 64. It should be appreciated that the directions in the form of the arrow 62 on the display 30 is not limiting and is merely illustrative. The directions may be provided in a textual form, an audible form, and so forth. It should be appreciated that rows of arcs 66 shown in FIG. 3 depict a direction for transmission of audio output from either the sound reproduction device 29 or the media reproduction device 27. As mentioned earlier, presenting the directions on the digital handheld device 22 would be desirable when output from either the sound reproduction device 29 or the media reproduction device 27 is not variable.

Figure 4:
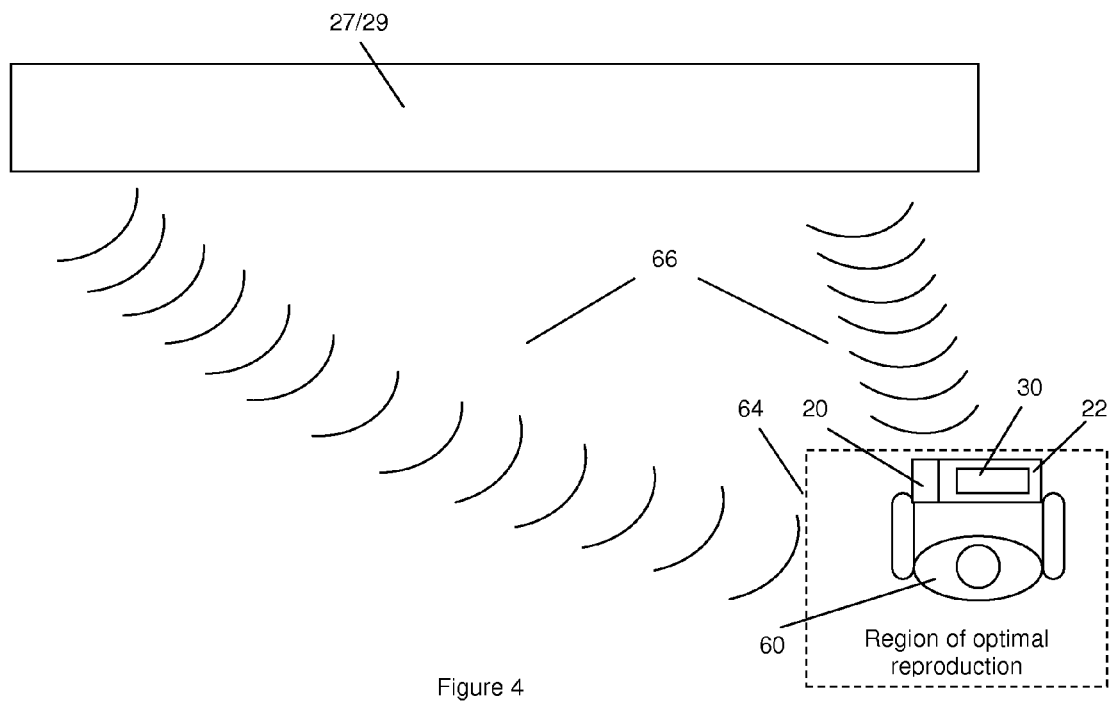
FIG. 4 shows a top view of a second usage scenario of the apparatus of the present invention.

Referring to FIG. 4, there is shown a top view of the instance when the data is transmitted via the wireless transceiver 42 of the apparatus 20 to either the sound reproduction device 29 or the media reproduction device 27. The user 60 of the digital handheld device 22 is shown to be at a location around either the sound reproduction device 29 or the media reproduction device 27. When the data via the wireless transceiver 42 is received by either the sound reproduction device 29 or the media reproduction device 27, the received data may be processed at either the sound reproduction device 29 or the media reproduction device 27 such that media playback parameters of the either the sound reproduction device 29 or the media reproduction device 27 are varied. The media playback parameters may be varied to enable the location of the user 60 to be the region of optimal media reproduction 64. It should be appreciated that rows of arcs 66 shown in FIG. 4 also depict a direction for transmission of audio output from either the sound reproduction device 29 or the media reproduction device 27.

Figure 5:
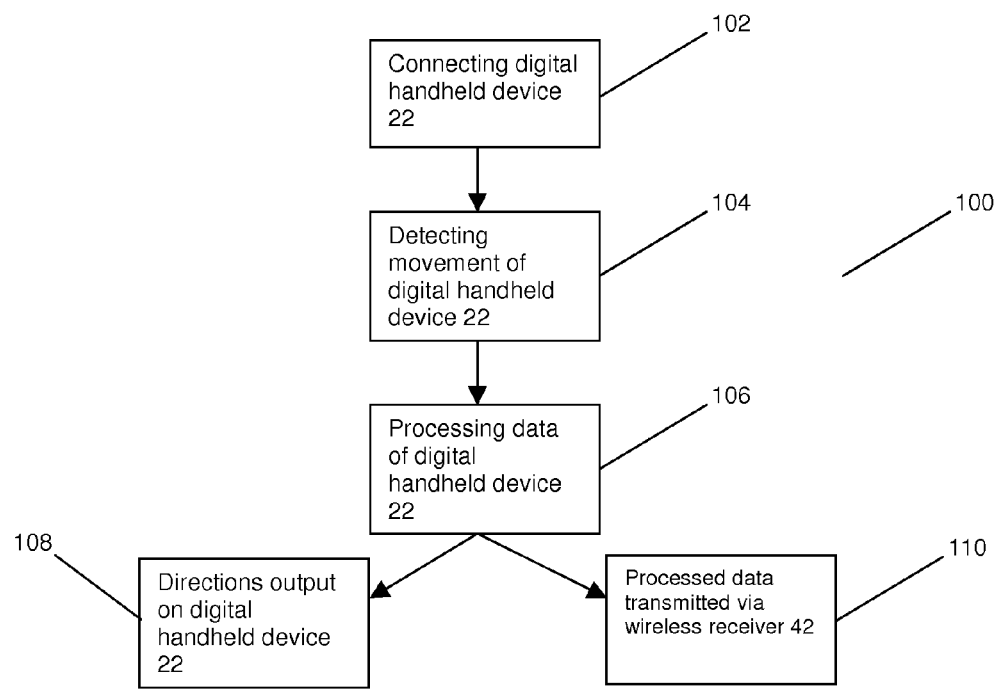
FIG. 5 shows a process flow of a first method of the present invention.

Referring to FIG. 5, there is provided a process flow for a first method 100 for optimizing playback of media content from a digital handheld device 22. The digital handheld device 22 may include, for example, a media player, a mobile phone, a digital camera, a navigation device, any combination of the aforementioned and so forth. The media content may be either permanently stored in the digital handheld device 22 or may be streamed from an external media content repository to the digital handheld device 22.

The first method 100 includes connecting the digital handheld device 22 to either the sound reproduction device 29 or the media reproduction device 27 (102). The connection with either the sound reproduction device 29 or the media reproduction device 27 may be wireless through a wireless transceiver 42. The wireless connection may be enabled either by wireless functionality incorporated within the digital handheld device 22 or by using a device which is functionally connectable to the digital handheld device 22 for providing wireless functionality.

Subsequently, the first method 100 includes detecting movement of the digital handheld device 22 relative to either the sound reproduction device 29 or the media reproduction device 27 (104). The movement of the digital handheld device 22 may be detected with at least one motion sensor 48. The at least one motion sensor 48 may include, for example, accelerometers, gyroscopes, and the like. The at least one motion sensor 48 may be incorporated within the digital handheld device 22 or may be within a device which is functionally connectable to the digital handheld device 22.

The first method 100 then includes processing data pertaining to the movement of the digital handheld device 22 (106). The processing of data may include performing a vector sum of movement of the digital handheld device 22 relative to either the sound reproduction device 29 or the media reproduction device 27. Determining the vector sum of movement of the digital handheld device 22 enables a position of the digital handheld device 22 relative to either the sound reproduction device 29 or the media reproduction device 27 to be determined.

Once the data is processed, either directions are output on the digital handheld device 22 for a user of the digital handheld device 22 (108), or the processed data is transmitted via the wireless transceiver 42 (110) to either the sound reproduction device 29 or the media reproduction device 27.

The directions may be output on the display 30 of the digital handheld device 22 and may advantageously lead the user to a position of optimum sound reproduction by the sound reproduction device 29. It should be appreciated that the position of optimum sound may vary from user to user, as each user may have either different preferences in relation to sound reproduction quality or different degrees of ear sensitivity. As such, the position of optimum sound reproduction may be a position where a majority of persons is deemed to perceive optimum sound reproduction. The directions may also be output on the digital handheld device 22 in an audible form. Similarly, the directions may lead the user to a position of at least one of, optimum image reproduction and optimum sound reproduction, by the media reproduction device 27. Presenting the directions on the digital handheld device 22 would be desirable when media output from either the sound reproduction device 29 or the media reproduction device 27 is not variable.

When the media output from either the sound reproduction device 29 or the media reproduction device 27 is variable, the data may preferably be transmitted via the wireless transceiver 42 to either the sound reproduction device 29 or the media reproduction device 27. As such, when the data via the wireless transceiver 42 is received by either the sound reproduction device 29 or the media reproduction device 27, the received data may be processed such that media playback parameters of either the sound reproduction device 29 or the media reproduction device 27 are varied. The media playback parameters may include, for example, relative audio phase, audio delay, amplitude of audio, frequency response of audio, image contrast, image refresh rate, image brightness, and so forth. The variation of the media playback parameters advantageously ensures optimal media content playback at a position of the user of the digital handheld device 22, in a manner which is not limited by the position of the user. The media output may thus be optimized for a particular position of the user.

Referring to FIG. 7, there is provided a process flow for a second method 200 for optimizing playback of media content from a digital handheld device 22. The digital handheld device 22 may include, for example, a media player, a mobile phone, a digital camera, a navigation device, any combination of the aforementioned and so forth. The media content may be either permanently stored in the digital handheld device 22 or may be streamed from an external media content repository to the digital handheld device 22.

The second method 200 includes connecting the digital handheld device 22 to either the sound reproduction device 29 or the media reproduction device 27 (202). The connection with either the sound reproduction device 29 or the media reproduction device 27 may be wireless through a wireless transceiver 42. The wireless connection may be enabled either by wireless functionality incorporated within the digital handheld device 22 or by using a device which is functionally connectable to the digital handheld device 22 for providing wireless functionality.

Subsequently, the second method 200 includes detecting audio reproduction quality at a digital handheld device 22 (204). The audio reproduction quality may be detected with at least one acoustics sensor 49. The at least one acoustics sensor 49 may include, a microphone 45 for detecting audio reproduction and an audio module 43 for determining the audio reproduction quality of the detected audio. The at least one acoustics sensor 49 may be incorporated within the digital handheld device 22 or may be within a device which is functionally connectable to the digital handheld device 22.

The second method 200 then includes processing information pertaining to the audio reproduction quality at a digital handheld device 22 (206). The processing of the information may include determining either a position of optimum audio reproduction or how media playback parameters of either the sound reproduction device 29 or the media reproduction device 27 are varied to produce optimum audio reproduction at a position of the digital handheld device 22. It should be appreciated that the position of optimum sound may vary from user to user, as each user may have either different preferences in relation to sound reproduction quality or different degrees of ear sensitivity. As such, the position of optimum sound reproduction may be a position where a majority of persons is deemed to perceive optimum sound reproduction.

Once the data is processed, either directions are output on the digital handheld device 22 for a user of the digital handheld device 22 (208), or the processed information is transmitted via the wireless transceiver 42 (210) to either the sound reproduction device 29 or the media reproduction device 27.

The directions may be output on the display 30 of the digital handheld device 22 and may advantageously lead the user to a position of optimum sound reproduction by the sound reproduction device 29. The directions may also be output on the digital handheld device 22 in an audible form. Similarly, the directions may lead the user to a position of at least one of, optimum image reproduction and optimum sound reproduction, by the media reproduction device 27. Presenting the directions on the digital handheld device 22 would be desirable when media output from either the sound reproduction device 29 or the media reproduction device 27 is not variable.

When the media output from either the sound reproduction device 29 or the media reproduction device 27 is variable, the information may preferably be transmitted via the wireless transceiver 42 to either the sound reproduction device 29 or the media reproduction device 27. As such, when the information via the wireless transceiver 42 is received by either the sound reproduction device 29 or the media reproduction device 27, the received information may be processed such that media playback parameters of either the sound reproduction device 29 or the media reproduction device 27 are varied. The media playback parameters may include, for example, relative audio phase, audio delay, amplitude of audio, frequency response of audio, and so forth. The variation of the media playback parameters advantageously ensures optimal media content playback at a position of the user of the digital handheld device 22, in a manner which is not limited by the position of the user. The media output may thus be optimized for a particular position of the user.

Whilst there has been described in the foregoing description preferred embodiments of the present invention, it will be understood by those skilled in the technology concerned that many variations or modifications in details of design or construction may be made without departing from the present invention.

The invention claimed is:

1. An apparatus configured to couple a digital handheld device which is functionally connectable thereto and a reproduction device, the digital handheld device being operable by a user to communicate data via the apparatus such that the data is received by the reproduction device to produce a media output, the reproduction device having a region of optimal media reproduction in association with the media output, the apparatus including:

at least one sensor for determining at least of one of movement of the apparatus and information relating to audio reproduction quality associated with the reproduction device, the reproduction device having media playback parameters which are variable in accordance with data communicated via the apparatus and received by the reproduction device; and a controller coupled to the at least one sensor such that at least one movement of the apparatus is determined and information relating to audio reproduction quality is communicated to the controller and processed in a manner so as to provide an indication which is indicative of the region of optimal media reproduction such that based on the indication, the user is led to the region of optimal media reproduction, wherein the media playback parameters of the reproduction device are variable based on the data communicated via the apparatus such that the region of optimal media reproduction of the reproduction device is adjusted to position of the user.

2. The apparatus of claim 1, the reproduction device comprising a receptor, the reproduction device being one of a sound reproduction device and a media reproduction device.

3. The apparatus of claim 2 further comprising:

a first electrical contact set for a functional connection to a second electrical contact set located within the receptor;

at least one electrical line coupled to the first electrical contact set for passing current from the second electrical contact set via the first electrical contact set to a first connector which is able to couple to a second connector of the digital handheld device; and at least one data line coupled to the first connector for passing data from the digital handheld device via the first connector to either a wireless transceiver or the first electrical contact set.

4. The apparatus of claim 3, wherein the receptor is only able to receive the apparatus.

5. The apparatus of claim 3, wherein the first electrical contact set is for transmitting data from a digital handheld device coupled to the apparatus to either the sound reproduction device or the media reproduction device.

6. The apparatus of claim 5, wherein the data is either media content playback instructions or media content.

7. The apparatus of claim 3, further including an induction charging module coupled to the at least one electrical line, the induction charging module being for enabling induction charging of a power source of the digital handheld device when the digital handheld device is functionally connected to the apparatus.

8. The apparatus of claim 3, wherein optimal media reproduction includes at least one of optimum image reproduction and optimum sound reproduction.

9. The apparatus of claim 3, wherein the wireless transceiver coupled to the controller is for transmitting data wirelessly from the digital handheld device coupled to the apparatus to either the sound reproduction device or the media reproduction device.

10. The apparatus of claim 9, wherein the data is either media content playback instructions or media content.

11. The apparatus of claim 3, wherein the placement of the digital handheld device at the receptor enables charging of a power source of the digital handheld device.

12. The apparatus of claim 3, wherein the controller is able to transcode the media content to minimize a processing load on the digital handheld device.

13. The apparatus of claim 3, wherein transmitting the data via the wireless transceiver to either a sound reproduction device or a media reproduction device varies media playback parameters of either the sound reproduction device or the media reproduction device.

14. The apparatus of claim 13, wherein the media playback parameters are selected from a group consisting of: relative audio phase, audio delay, amplitude of audio, frequency response of audio, image contrast, image refresh rate, and image brightness.

15. The apparatus of claim 13, wherein the variation of the media playback parameters ensures optimal media content playback at a position of the user of the apparatus.

16. The apparatus of claim 3, further including at least one acoustic sensor coupled to the controller for detecting audio reproduction quality at the apparatus, wherein information on the audio reproduction quality at the apparatus is input to the controller, the controller processing the information on the audio reproduction quality at the apparatus to either output directions on the digital handheld device for a user of the digital handheld device, or transmit the data via the wireless transceiver.

17. A method for optimizing playback of media content from a digital handheld device, the method including:
providing an apparatus configurable to couple the digital handheld device which is functionally connectable thereto and a reproduction device, the digital handheld device being operable by a user to communicate data via the apparatus such that the data is received by the reproduction device to produce a media output, the reproduction device having a region of optimal media reproduction in association with the media output, the apparatus comprising at least one sensor and a controller coupled to the at least one sensor;
determining, via the at least one sensor, at least of one of movement of the apparatus and information relating to audio reproduction quality associated with the reproduction device, the reproduction device having media playback parameters which are variable in accordance with data communicated via the apparatus and received by the reproduction device;
communicating, to the controller, at least one of movement of the apparatus determined and information relating to audio reproduction quality; and
processing, via the controller, at least one movement of the apparatus determined and information relating to audio reproduction quality in a manner so as to provide an indication which is indicative of the region of optimal media reproduction such that based on the indication, the user is led to the region of optimal media reproduction,
wherein the media playback parameters of the reproduction device are variable based on the data communicated via the apparatus such that the region of optimal media reproduction of the reproduction device is adjusted to position of the user.

18. The method of claim 17, wherein the media playback parameters are selected from a group consisting of: relative audio phase, audio delay, amplitude of audio, frequency response of audio, image contrast, image refresh rate, and image brightness.

19. The method of claim 17, wherein the movement of the digital handheld device is detected with at least one motion sensor.

20. The apparatus of claim 16, wherein the at least one acoustics sensor includes:
a microphone for detecting audio reproduction; and
an audio module for determining the audio reproduction quality of the detected audio.

* * * * *